United States Patent
Chandranna et al.

(10) Patent No.: US 11,991,152 B2
(45) Date of Patent: May 21, 2024

(54) BYPASSING IKE FIREWALL FOR CLOUD-MANAGED IPSec KEYS IN SDWAN FABRIC

(71) Applicant: HEWLETT PACKARD ENTERPRISE DEVELOPMENT LP, Houston, TX (US)

(72) Inventors: Shreekanth Chandranna, Santa Clara, CA (US); Bhagvan Cheeyandira, Santa Clara, CA (US); Gopalakrishnan Gunasekaran, Santa Clara, CA (US)

(73) Assignee: Hewlett Packard Enterprise Development LP, Spring, TX (US)

(*) Notice: Subject to any disclaimer, the term of this patent is extended or adjusted under 35 U.S.C. 154(b) by 122 days.

(21) Appl. No.: 17/667,987

(22) Filed: Feb. 9, 2022

(65) Prior Publication Data
US 2023/0254289 A1     Aug. 10, 2023

(51) Int. Cl.
*H04L 9/40*     (2022.01)

(52) U.S. Cl.
CPC ........ *H04L 63/029* (2013.01); *H04L 63/0236* (2013.01); *H04L 63/0272* (2013.01); *H04L 63/0435* (2013.01); *H04L 63/061* (2013.01)

(58) Field of Classification Search
CPC ............... H04L 63/029; H04L 63/0236; H04L 63/0272; H04L 63/0435; H04L 63/061; H04L 63/0281; H04L 63/20; H04L 63/205; H04L 63/16; H04L 63/166; H04L 12/4633; H04L 41/40; H04L 43/20; H04L 2209/76; H04W 12/088; H04W 12/0471
See application file for complete search history.

(56) References Cited

U.S. PATENT DOCUMENTS

| | | | |
|---|---|---|---|
| 8,639,936 B2 | 1/2014 | Hu et al. | |
| 10,938,717 B1* | 3/2021 | Sundararajan | H04L 45/38 |
| 2015/0188949 A1* | 7/2015 | Mahaffey | H04L 41/0894 |
| | | | 726/1 |

(Continued)

FOREIGN PATENT DOCUMENTS

| | | |
|---|---|---|
| CN | 111614796 A | 9/2020 |
| CN | 111614796 A | 9/2020 |

OTHER PUBLICATIONS

Carrel, D., et al., "IPsec Key Exchange Using a Controller Draft-Carrel-Ipsecme-Controller-Ike," Network Working Group, vol. 1 Mar. 11, 2019, pp. 21.

(Continued)

*Primary Examiner* — Techane Gergiso
(74) *Attorney, Agent, or Firm* — Sheppard Mullin Richter & Hampton LLP

(57) ABSTRACT

Systems and methods are provided for effectuating overlay tunnels between software-defined wide area network (SD-WAN) end-point devices despite the use of IPSec pass-through in one or more network devices, such as modems or routers that exist between the end-point devices. In particular, the Internet Key Exchange (IKE) protocol can be allowed to progress until a modem/router is able to establish an IKE tunnel, after which overlay packets using cloud-managed keys can be allowed to pass through the modem/router. An overlay tunnel may then be established between the end-point devices, and the IKE tunnel can be taken down.

14 Claims, 6 Drawing Sheets

(56) References Cited

U.S. PATENT DOCUMENTS

| | | | | |
|---|---|---|---|---|
| 2016/0080502 | A1* | 3/2016 | Yadav | H04L 45/302 |
| | | | | 709/227 |
| 2020/0059370 | A1* | 2/2020 | Abraham | H04L 9/3263 |
| 2020/0104161 | A1* | 4/2020 | Kapur | G06F 11/2041 |
| 2020/0177503 | A1* | 6/2020 | Hooda | H04L 12/66 |
| 2020/0252234 | A1* | 8/2020 | Ramamoorthi | H04L 45/22 |
| 2021/0185013 | A1* | 6/2021 | Zhang | H04L 61/5014 |
| 2021/0288881 | A1* | 9/2021 | Zhang | H04L 12/4633 |
| 2021/0314385 | A1* | 10/2021 | Pande | H04L 41/042 |
| 2022/0210005 | A1* | 6/2022 | Keane | H04L 41/0663 |
| 2022/0385498 | A1* | 12/2022 | Janakiraman | H04L 12/4633 |
| 2022/0394016 | A1* | 12/2022 | Solanki | H04L 12/4633 |
| 2023/0143157 | A1* | 5/2023 | Solanki | H04L 63/029 |
| | | | | 726/12 |

OTHER PUBLICATIONS

Marin-Lopez, R., et al., "Software-Defined Networking (SDN)—based IPsec Flow Protection draft-ietf-i2nsf-sdn-ipsec-flow-protection-14," Internet Draft, Mar. 25, 2021, pp. 80.

Qa Café, "IPSEC pass through testing," Jan. 29, 2022, <https://web.archive.org/web/20220129095539/https://www.qacafe.com/resources/2013-08-28-ipsec-pass-through-testing/>, 2 pages.

* cited by examiner

BYPASSING IKE FIREWALL FOR CLOUD-MANAGED IPSec KEYS IN SDWAN FABRIC

BACKGROUND

In computer networking, a virtual private network (VPN) can refer to an encrypted connection over the Internet from a device to a network, where the encryption protects any sensitive data being transmitted between the device and the network. Thus, VPNs allow users to access, e.g., a private network and exchange sensitive data remotely via public networks, such as the Internet.

Associated with VPNs is Internet Protocol Security (IPSec), which refers to a suite of protocols used to encrypt data packets in order to facilitate secure connections between devices exchanging the data packets. IPSec can be thought of as a security layer that is itself, embedded in a network.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
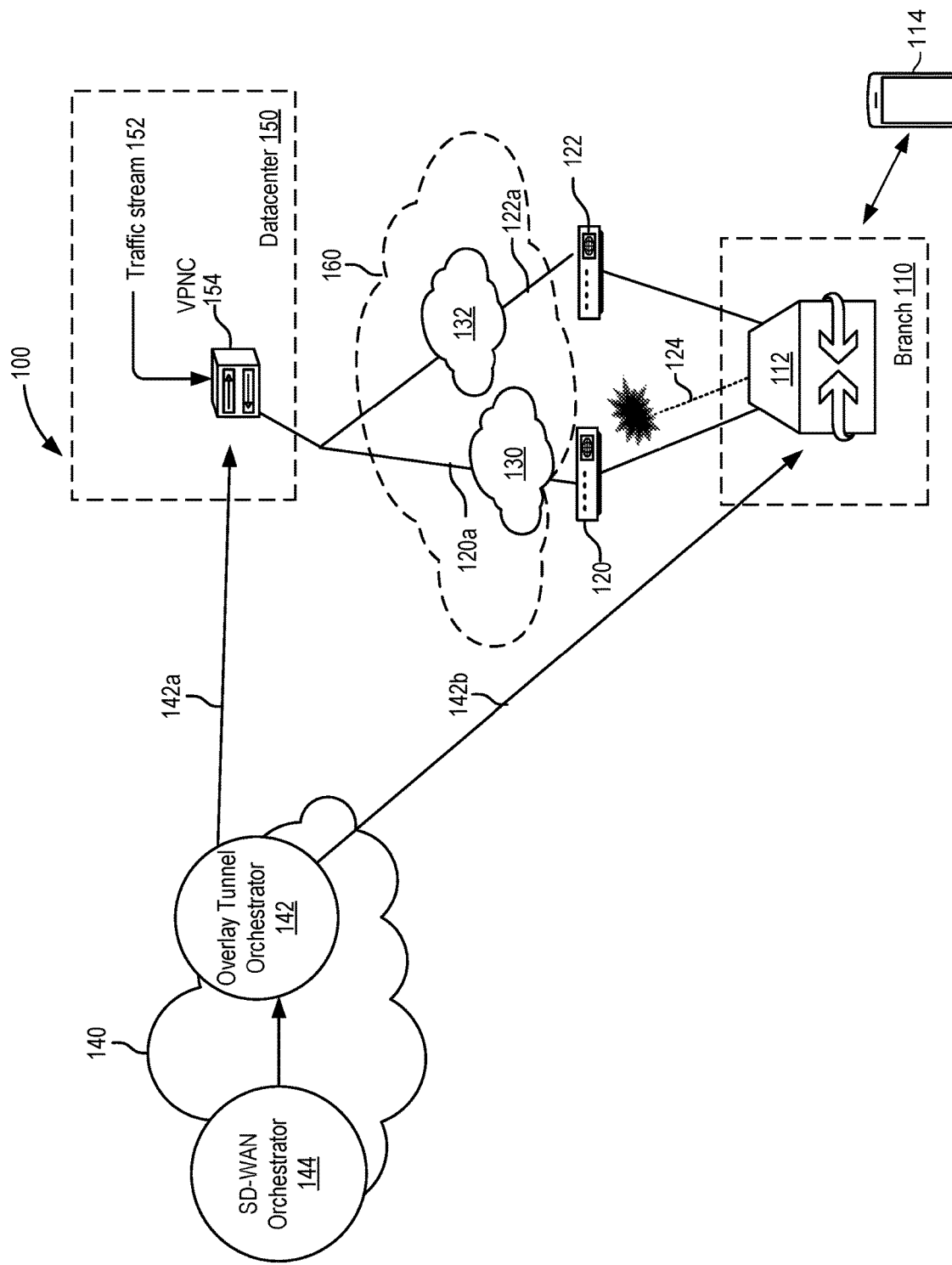
FIG. 1 illustrates an example of an SD-WAN in which embodiments of the present disclosure may be implemented.

The figures are not exhaustive and do not limit the present disclosure to the precise form disclosed.

DETAILED DESCRIPTION

As described above, network devices may use IPSec to secure sensitive data during transmission in a VPN, where IPSec keys may be used by network devices to enable the establishment of an overlay tunnel between the network devices. A feature referred to as IPSec passthrough, allows IPSec tunnels to "pass through" a network device, such as a router or modem. That is, certain network devices such as routers/modems typically connect to the Internet using a network address translation (NAT) protocol, which is incompatible with IPSec. The IPSec passthrough feature makes IPSec compatible with the NAT protocol, where layer 2 tunneling protocol (L2TP) can be used to enable point-to-point sessions through the Internet at the L2 level.

One environment in which the use of IPSec may be problematic is that of a software-defined wide area network (SD-WAN). In software-defined branch deployments, SD-WAN technology may be used to centralize management of an organization's WAN across multiple physical branch locations. Commonly implemented as a cloud-based management solution, SD-WAN technologies rely on virtualization, overlay networks, and onsite SD-WAN devices and software platforms to (among other things) better manage network traffic.

When cloud-managed tunnel orchestration is used in an SD-WAN, IPSec packets used to setup the aforementioned overlay tunnel are dropped at the router/modem preventing the overlay tunnel from being established. This is because with cloud-managed IPSec keys, network devices (e.g., gateways, VPNCs, etc.), may connect to an SD-WAN orchestrator in the cloud and receive the IPSec keys. Subsequently, a first end-point device, for example, would attempt to send boot-strap encrypted packets to determine if the IPSec keys were received by a second end-point device. End-point devices, as used herein can refer to network devices/hardware controllers that can communicate with a network, e.g., the aforementioned gateways and VPNCs. Upon receiving a response from the second end-point device, typically, an overlay tunnel between the first and second end-point devices would be established.

However, when network devices such as routers/modems use the IPSec passthrough feature (which is generally enabled by default in next-generation router/modem configurations), NAT traversal sessions between first and second end-point devices are inspected. IPSec packets are allowed to go through the router/modem between the first and second end-point devices only if Internet Key Exchange (IKE) protocol exchanges occur and are observed. It should be understood that most IPSec implementations include an IKE daemon running in user space and an IPSec stack that processes IP packets. IKE is a protocol used to set up a security association (SA) in the IPSec protocol. Because of the IPSec passthrough feature, IKE exchanges need not be performed. Rather, the first and second end-point devices may simply receive the IPSec keys from the cloud-based SD-WAN orchestrator to be used directly, where the first and second end-point devices engage in a type(s) of direct hand-shaking using the IPSec keys to establish the overlay tunnel. It should be understood that without performing an IKE exchange, no traffic can be transmitted between the first and second end-point devices, i.e., the IKE protocol exchange typically should occur before an overlay tunnel can be established using IPSec keys.

Accordingly, various embodiments are directed to circumventing or bypassing the IKE firewall/exchange requirement of the IPSec passthrough feature. In particular, when network devices, such as the first and second end-point devices discussed above, attempt to exchange data, each connects to the cloud-based SD-WAN orchestrator and may receive IPSec keys. The IKE negotiation process is initiated so that the router/modem may become aware of the IKE exchanges so that from the perspective of the router/modem, the first and second end-point devices comprise end-points of a legitimate IKE/IPSec session enabling an IKE/IPSec tunnel to be established. The first and second end-point devices perform a hand-shake operation with IPSec data packets using the cloud-managed IPSec keys provided by the cloud-managed SD-WAN orchestrator. Because the first and second end-point devices, due to the IKE exchange, are known to the router/modem, a cloud-managed overlay tunnel may be established between the first and second end-point devices. Thereafter, the IKE/IPSec tunnel may be (gracefully) taken down. Graceful take down of an IKE/IPSec tunnel can refer to disabling a link between the first and second end-point devices without communications downtime or without affecting/impacting user data traffic therebetween. In this way, despite the use of IPSec pass-through in devices such as routers/modems, an overlay tunnel can still be established between end-point devices, where uplinks pass through the routers/modems.

FIG. 1 depicts an example SD branch deployment, in accordance with various examples of the presently disclosed technology. SD branch deployment 100 includes a first end-point device, e.g., a branch gateway 112 at branch/customer site 110, Internet Service Providers (ISPS 130, 132) that at least in part, make up a WAN 160 controlled via SD-WAN 140, and a second end-point device, which in this case may be VPNC 154 (which receives traffic from a traffic stream source 152) of a datacenter 150.

Traffic stream 152 may be any data transmission (e.g. streaming media, information dissemination, etc.) addressed to one or more receivers/end-points. In the example of FIG. 1, only one traffic stream (i.e., traffic stream 152) is depicted in datacenter source 150. However, in other examples datacenter 150 may include any number of traffic streams. Similarly, SD branch deployment 100 may include any number of traffic sources, recipients, etc.

In general, a VPNC, such as VPNC 154 may refer to a hardware or software application used for connecting VPNs. As depicted, datacenter 150 includes VPNC 154. Accordingly, VPNC 154 may be used to transmit data associated with traffic stream 152 to one or more branches, in this example, to branch gateway 112 of branch 110 (as orchestrated by Overlay Tunnel Orchestrator 142).

SD-WAN 140 may be a cloud-based SD-WAN technology platform which includes a centralized service capable of performing orchestration operations within a given WAN (e.g. WAN 160). Generally, SD-WAN orchestration may refer to a centralized administration service(s) that provides cloud-delivered WAN control and management. In certain examples, SD-WAN 140 may include additional centralized network management services. Accordingly, residing within SD-WAN 140 may be various sub-services. As depicted, SD-WAN 140 includes Overlay Tunnel Orchestrator 142 which may be a sub-service of SD-WAN Orchestrator 144, which, in addition to orchestrating tunnels, may orchestrate routes, orchestrate key exchange, and so on.

Overlay Tunnel Orchestrator 142 may be a central management entity which orchestrates routes for traffic between datacenter 150 and branch 110. In order to accomplish this task, Overlay Tunnel Orchestrator 142 must understand aspects of network topology/configuration, as well as the needs of the network's end-points. Abreast of this information, Overlay Tunnel Orchestrator 142 may then orchestrate routes between an appropriate VPNC and branch gateway and on to interested recipients. As a central management entity incorporated within SD-WAN 140, Overlay Tunnel Orchestrator 142 may collect this information and make these determinations in a manner which reduces WAN bandwidth consumption. Said differently, centralized decision-making within Overlay Tunnel Orchestrator 142 greatly reduces the number of communications/decisions required to transmit traffic, such as multicast traffic, within, e.g., a large scale SD branch deployment. As described above, under the decentralized approach used by existing technologies, much of the aforementioned information would be communicated among the various network devices/nodes (e.g. routers, branch gateways, VPNCs) of a network tasked with transmitting traffic. Overlay Tunnel Orchestrator 142 may obtain certain network configuration/topology information from another service(s) of SD-WAN orchestrator 144, and information related to the needs of the network's recipients/hosts from designated branch gateway leaders.

For example, SD-WAN orchestrator 144 may include a containers-as-a-Service (CaaS) service (not shown) that may refer to a cloud-based service which offers organizations a way to manage their virtualized applications, clusters, and containers. A CaaS may include a container orchestration engine that runs and maintains infrastructure between an organization's clusters. A CaaS may also manage clusters associated with branch gateways, which may be referred to as BG clusters. Within a given BG cluster, there will be will one leader. As will be described in greater detail below, only the leader of a given BG cluster will (a) send requests to join or leave a multicast group to Overlay Multicast Orchestrator 142; and (b) receive multicast traffic from one of the VPNCs which reside in datacenter 150. By leveraging existing cloud-based service infrastructure and features, examples of the presently disclosed technology can enhance a multicast orchestration service without consuming significant additional WAN bandwidth, cloud resources, etc.

In some examples, a route computation engine in Overlay Tunnel Orchestrator 142 may calculate routes for traffic based on the aforementioned source information (e.g., which VPNC is associated with a given multicast stream) and receiver information (which branch gateways are designated leaders for the given multicast stream). In certain of these examples, the route computation engine may learn to calculate optimal routes for reducing bandwidth consumption for WAN 160. For example, Overlay Tunnel Orchestrator 142 may employ artificial intelligence (AI) or machine learning to determine overlay tunnels for multicast traffic between VPNCs and branch gateways based on traffic requirements and historical data.

In other examples, Overlay Tunnel Orchestrator 142 may take advantage of routes which have already been calculated by SD-WAN 140 (and/or its subservices). Existing SD-WAN services typically calculate routes for unicast traffic between VPNCs and branch gateways. Accordingly, Overlay Tunnel Orchestrator 142 orchestrator may orchestrate traffic through these pre-calculated routes.

It should be understood that In a given network, the underlay (or underlay network) may refer to the physical connections of the network (e.g., Ethernet). By contrast, the overlay (or overlay network) may refer to a logical network which uses virtualization to build connectivity on top of the physical infrastructure of the network using tunneling encapsulation. In other words, "overlay tunnels" may refer to virtual links which connect nodes of a network. Here, overlay tunnels may connect VPNCs and branch gateways. Various protocols such as IPSec and GRE may be used to transmit network traffic through these overlay tunnels. In general, SD-WAN architectures like the one depicted may rely on overlay tunnels to connect the various branches and other nodes of their network.

As used herein, a branch may refer to a physical location at which one or more end-point devices may connect to WAN 160. For example a branch may be a remote office of an organization, a café/coffee shop, a home office, etc. While only a single branch (branch 110) is depicted in the example of FIG. 1, large scale SD branch deployments may include any number of branches. In certain examples, these may be branches of a particular organization. In other examples branches may not all be associated with a single organization. While not depicted, each branch may have its own local area network (LAN). The various network devices (e.g. hosts (user-associated devices), end-point devices, such as branch gateways, network devices, such as routers, etc.) of a given branch may communicate with each other over the branch's LAN. A branch may have any number of endpoints. In this example branch gateway 112 may receive traffic (such as multicast traffic) associated with traffic stream 152.

A given host, an example of which is smartphone 114, may be connected to (i.e. "behind") branch gateway 112. As described above, multiple branch gateways may be deployed at a branch for load balancing and redundancy purposes. Accordingly, a given host may connect with a given branch gateway based on factors such as path latency.

A branch gateway may refer to a network device (hardware or software) which transfers traffic between a branch and other networks. For example, the branch gateway 112 depicted in FIG. 1 may transfer traffic between WAN 160 and the various network devices (not shown) of their branch (e.g. other branch gateways, hosts, etc.).

As alluded to above, when IPSec passthrough is enabled in network devices, such as modems and routers, which in the example of FIG. 1, includes modems 120 and 122, an overlay tunnel cannot be established in accordance with conventional mechanisms/methods. In this particular example, uplinks from branch gateway 112 pass through two modems/routers 120 and 122, each associated with a different service provider, in particular, Internet Service Providers (ISPs).

When the IPSec passthrough feature is enabled in a network device, such as network device 120, which may be a modem, network device 120 inspects 4500 sessions for IKE transactions/exchanges between end-point devices, e.g., VPNC 154 and branch gateway 112. Typically, for NAT traversal, the UDP 4500 port of a network device is enabled. As noted above, network device 120 only allows IPSec packets to pass through after performing an IKE exchange between end-points, in this example, VPNC 154 and branch gateway 112. It should be understood that IPSec packets can be passed through a network device without NAT traversal support vis-à-vis the IPSec passthrough feature.

In an SD-WAN managed network, such as WAN 160, Overlay Tunnel Orchestrator 142 may establish an overlay tunnel without a need for the IKE exchange. Rather, Overlay Tunnel Orchestrator 142 may push or transmit IPSec keys (that were derived) directly to the end-point devices. In this example, FIG. 1 illustrates that such IPSec keys are pushed via links 142*a* and 142*b* to VPNC 154 and branch gateway 112, respectively. In this example, links 142*a* and 142*b* are Internet or INET links. It should be understood that INET links are merely an example of the type of links/uplinks that can exist between end-point devices. In other embodiments, the uplink may be a Multiprotocol Label Switching (MPLS) link, a Long-term-evolution (LTE)/4G link, a metro-Ethernet link, etc.

However, because IPSec keys are provided from the cloud (Overlay Tunnel Orchestrator 142) directly to VPNC 154 and branch gateway 112, there is no need to perform a key exchange per the IKE protocol. Thus, there is no mechanism to allow such an IKE exchange to occur. The result is that overlay packets (from, e.g., branch gateway 112) that would typically be used to establish an IPSec tunnel between branch gateway 112 and VPNC 154 are not allowed to pass through network device/modem 120. Thus, as illustrated in FIG. 1, the overlay packets transmitted via link 124 are inspected, but ultimately are dropped at modem 120, and accordingly, no IPSec tunnel (and no subsequent overlay tunnel) can be established between the end-points, branch gateway 112 and VPNC 154. Accordingly, SD-WAN cloud-managed tunnel orchestration is not possible in conventional systems/methods that involve use of the IPSec passthrough feature of network devices.

Figure 2A:
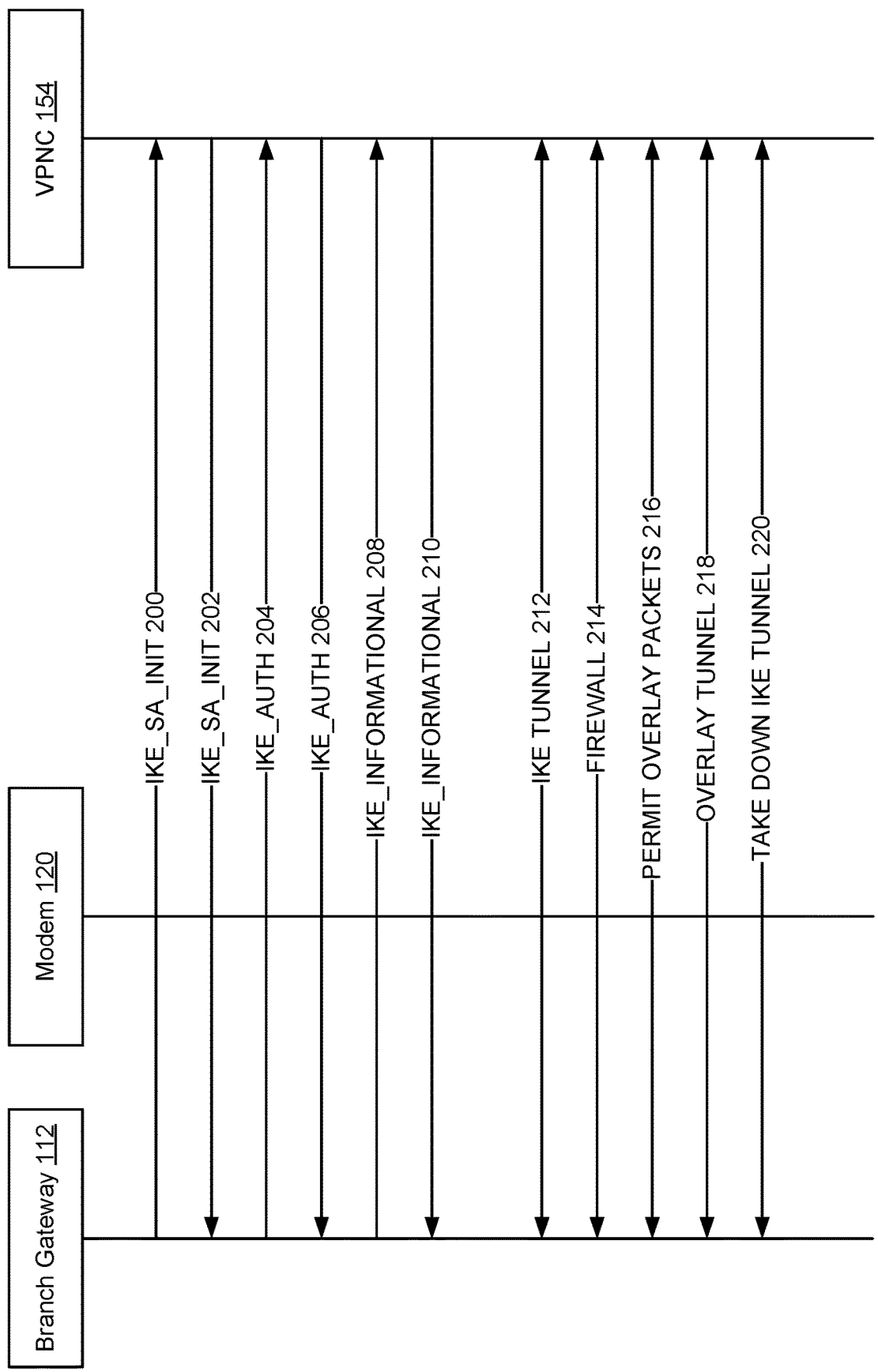
FIG. 2A is an example message flow between network devices effectuating cloud-managed tunnel orchestration despite the use of IPSec passthrough mechanism

Referring now to FIG. 2A, under typical circumstances, branch gateway 112 and VPNC 154 would engage in IPSec key exchange using the IKE protocol. In particular, branch gateway 112 and VPNC 154 would engage in an IKE_SA_INIT exchange (to establish a secure data channel). In this example, branch gateway 112 may transmit an initial IKE_SA_INIT packet 200 to VPNC 154, which can be a request including at least a proposed security association (SA), and keying information. The purpose for such a IKE_SA_INIT exchange is for an initiator (in this example, branch gateway 112) to send a list of SA proposals to a responder (in this example, VPNC 154). A nonce and Diffie-Hellman value may also be transmitted in the IKE_SA_INIT request 200. VPNC 154, as the responder, may select one of the SA proposals sent by branch gateway 112 (an SA proposal that is acceptable to VPNC 154) and send its selection in a responsive IKE_SA_INIT message/response 202 (along with its corresponding nonce and Diffie-Hellman values). In some embodiments, message authentication, key generation, encryption algorithm and Diffie-Hellman group information can be negotiated during this IKE_SA_INIT exchange. It should be understood that the Diffie-Hellman values can refer to values used by a Diffie-Hellman key algorithm to generate a shared master key that can be used by branch gateway 112 and VPNC 154 (or derive IPSec keys for SAs).

Subsequent to the IKE_SA_INIT exchange, branch gateway 112 and VPNC 154 can independently generate keying information to support IKE SA (which can include a key pair to authenticate IKE peers, a key pair for authenticating messages and a key pair for message encryption sent under protection of the established IKE SA, as well as keying information that can be used to derive keys for child SAs. Branch gateway 112 and VPNC 154 may engage in an IKE_AUTH exchange. In particular, the IKE_AUTH exchange may performed to authenticate VPNC 154 and create a first IPSec SA. This completes activation of the IKE SA, where branch gateway 112 transmits IKE_AUTH request 204 (which contains the network identity of branch gateway 112, e.g., IP or MAC address of the branch gateway 112, and identification certificate, or other information/mechanism used to identify an end-point device/network device) as well as authentication information depending on the type of authentication declared by an initiator (branch gateway 112) in its IKE_SA_INIT request 200. Authentication information can include an encrypted hash or a digital signature. The IKE_SA_INIT request 200 may, in some embodiments include an expected responder (VPNC 154) identity. VPNC 154 may respond to IKE_AUTH request 204 with an IKE_AUTH response 206, which includes VPNC 154's identity and authentication information.

Following the IKE_AUTH exchange, branch gateway 112 and VPNC 154 can engage in an IKE_INFORMATIONAL exchange. The information that can be exchanged between branch gateway 112 and VPNC 154 via IKE_INFORMATIONAL request 208 and IKE_INFORMATIONAL response 210, respectively, may include one or more of "Notify," "Delete," or "Configuration" payloads. Notify payloads can carry error/status information. Delete payloads may inform a peer network device that the sender of the IKE_informational request has deleted as least one of its incoming SAs, and the responder is expected to delete those SAs. Configuration payloads contain information that can be used to negotiate configuration data between peers (between branch gateway 112 and VPNC 154).

As noted above, the IKE negotiation process is initiated so that the router/modem may become aware of the IKE exchanges. This is done so that from the perspective of the router/modem, the first and second end-point devices comprise end-points of a legitimate IKE/IPSec session enabling an IKE/IPSec tunnel to be established. In this example, network device 120 monitors/inspects IPSec (or Encapsulating Security Payload (ESP) packets) between branch gateway 112 and VPNC 154. ESP refers to a particular protocol used by IPSec, and ESP packets are allowed to pass through network device 120 only if IKE exchanges are observed to have occurred between the first and second end-point devices. By observing such IKE exchanges, network device 120 may consider the first and second end-point devices to be "legitimate." The entirety of a typical IKE exchange (SA, authentication, and informational exchanges) should be completed in order to determine the legitimacy of end-point devices. It should be noted that while IPSec leverages the ESP protocol/packets, IPSec may also use an authentication header (AH) protocol/packets. Thus, monitoring/inspecting IPSec packets may, in some embodiments, comprise monitoring/inspecting AH packets.

Upon determining that the end-point devices at issue, in this example, branch gateway 112 and VPNC 154 are legitimate, an IKE/IPSec tunnel may be established between branch gateway 112 and VPNC 154. In accordance with the SAs, modem/router 120 may establish a firewall 214. In this example, firewall 214 may be applied to data/traffic from traffic stream 152.

Now that IKE/IPSec tunnel 212 has been established, and with IPSec passthrough enabled, branch gateway 112 and VPNC 154 may perform the aforementioned handshake process using the cloud-managed keys (received from Overlay Tunnel Orchestrator 142). That is, overlay (IPSec/ESP/AH) packets are permitted to pass through modem 120. The negotiated IKE keys may be used until the cloud-managed keys become active, at which point, the negotiated IKE keys are removed/discarded, and they are no longer used to encrypt/secure traffic between the first and second end-point devices. Once branch gateway 112 and VPNC 154 have completed the handshake operation using the cloud-managed IPSec keys, overlay tunnel 218 may be established, and the IKE/IPSec tunnel 212 may be taken down at operation 220. As discussed above, this takedown is performed gracefully to avoid any disruptions to communications. It should be understood that the IKE/IPSec tunnel 212 is also an "overlay" tunnel. However, IKE/IPSec tunnel 212 differs from overlay tunnel 218 given the manner in which the keys (upon which the tunnels are generated) are derived. Again, the IKE/IPsec tunnel 212 is based on IKE/IPSec protocol-negotiated keys, while the overlay tunnel 218 is based on cloud-managed keys.

Figure 2B:
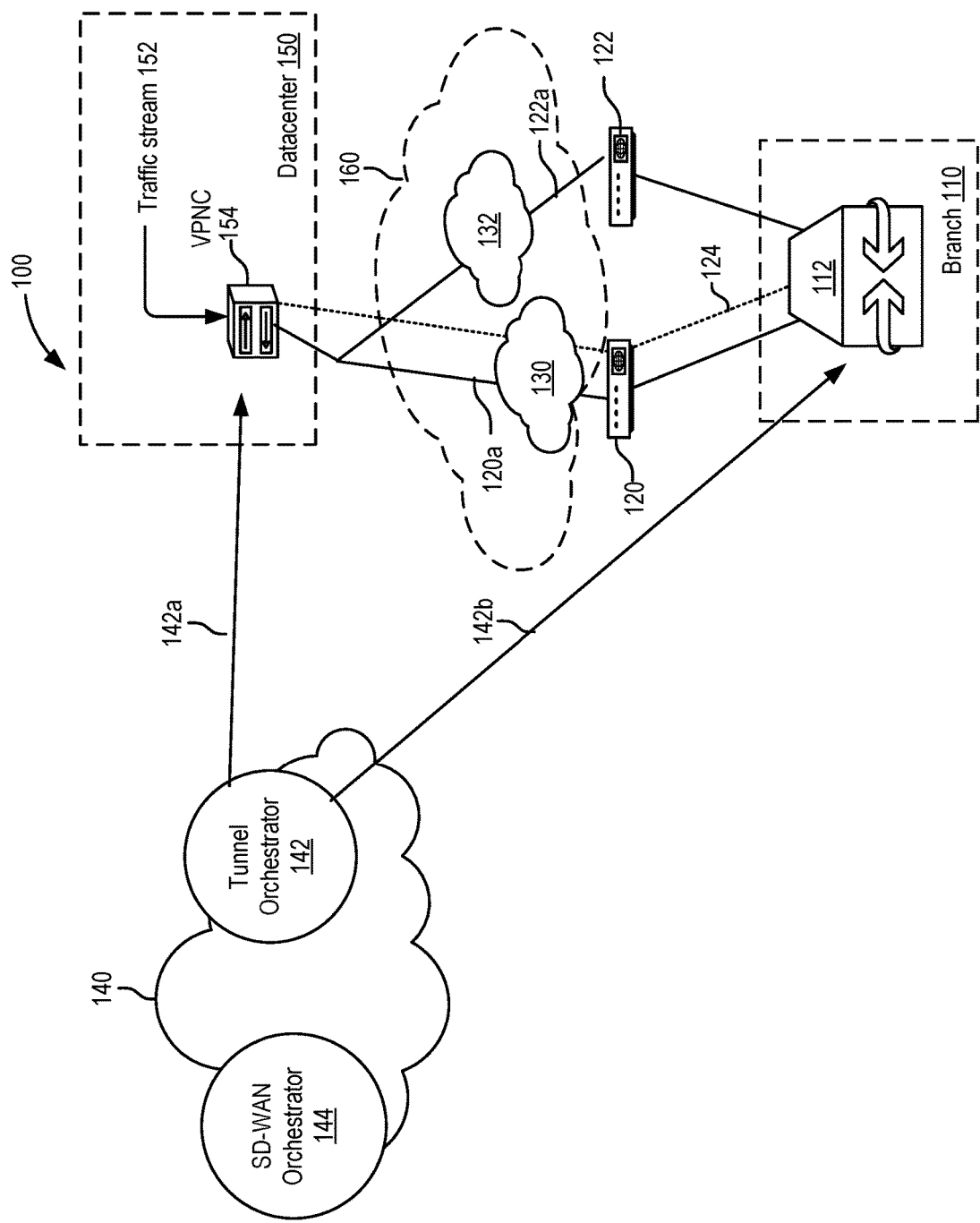
FIG. 2B illustrates the example SD-WAN of FIG. 1, adapted to allow cloud-managed tunnel orchestration despite the use of IPSec passthrough mechanism.

Referring now to FIG. 2B, similar to FIG. 1, SD branch deployment 100 includes a first end-point device (branch gateway 112 at branch/customer site 110), Internet Service Providers (ISPS 130, 132) that at least in part, make up a WAN 160 controlled via SD-WAN 134, and a second end-point device (VPNC 154, which receives traffic from traffic stream source 152) of datacenter 150. Again, traffic stream 152 may be any data transmission (e.g. streaming media, information dissemination, etc.) addressed to one or more receivers/end-points.

When the IPSec passthrough feature is enabled in a network device, such as network device 120, network device 120 inspects 4500 sessions for IKE transactions/exchanges between VPNC 154 and branch gateway 112. As discussed above, the IKE exchange(s) are allowed to commence and proceed to completion so that upon receipt of the cloud-managed keys from Overlay Tunnel Orchestrator 142, the overlay packets (IPSec/ESP packets) for establishing an overlay tunnel can pass through network device 120, e.g., to/from branch gateway 112 and VPNC 154 over links 120a and 124.

VPNC 154 and branch gateway 112 proceed with their hand shaking procedure to establish an overlay tunnel between the two end-point devices using the cloud-managed IKE keys received from Overlay Tunnel Orchestrator 142. The hand shaking procedure is possible (IPSec/IKE packets can now be exchanged) now that the IKE/IPSec tunnel has been established between VPNC 154 and branch gateway 112. An overlay tunnel can then be established using the cloud-managed keys, and the original/initial IKE/IPSec tunnel (established pursuant to the typical IKE exchange) can be gracefully taken down. As alluded to above, graceful takedown can refer to takedown of the IKE/IPSec tunnel without disturbing existing communications or data flows. In some embodiments, such a graceful takedown can be effectuated by switching to use of the cloud-managed keys and overlay tunnel, while maintaining the initial IKE/IPSec tunnel with a time-out duration before being taken down. For example, the IKE/IPSec tunnel can have a time-out of 9 to 10 seconds in order to allow any inflight/incoming packets to be processed. Alternatively, the original, IKE-negotiated keys may be discarded when there are no longer any incoming packets on the IKE/IPSec tunnel. Thus, instead of the IKE/IPSec overlay packets being dropped by/at network device 120, they are allowed to pass through so that the overlay tunnel can be established between branch gateway 112 and VPNC 154.

Figure 3A:
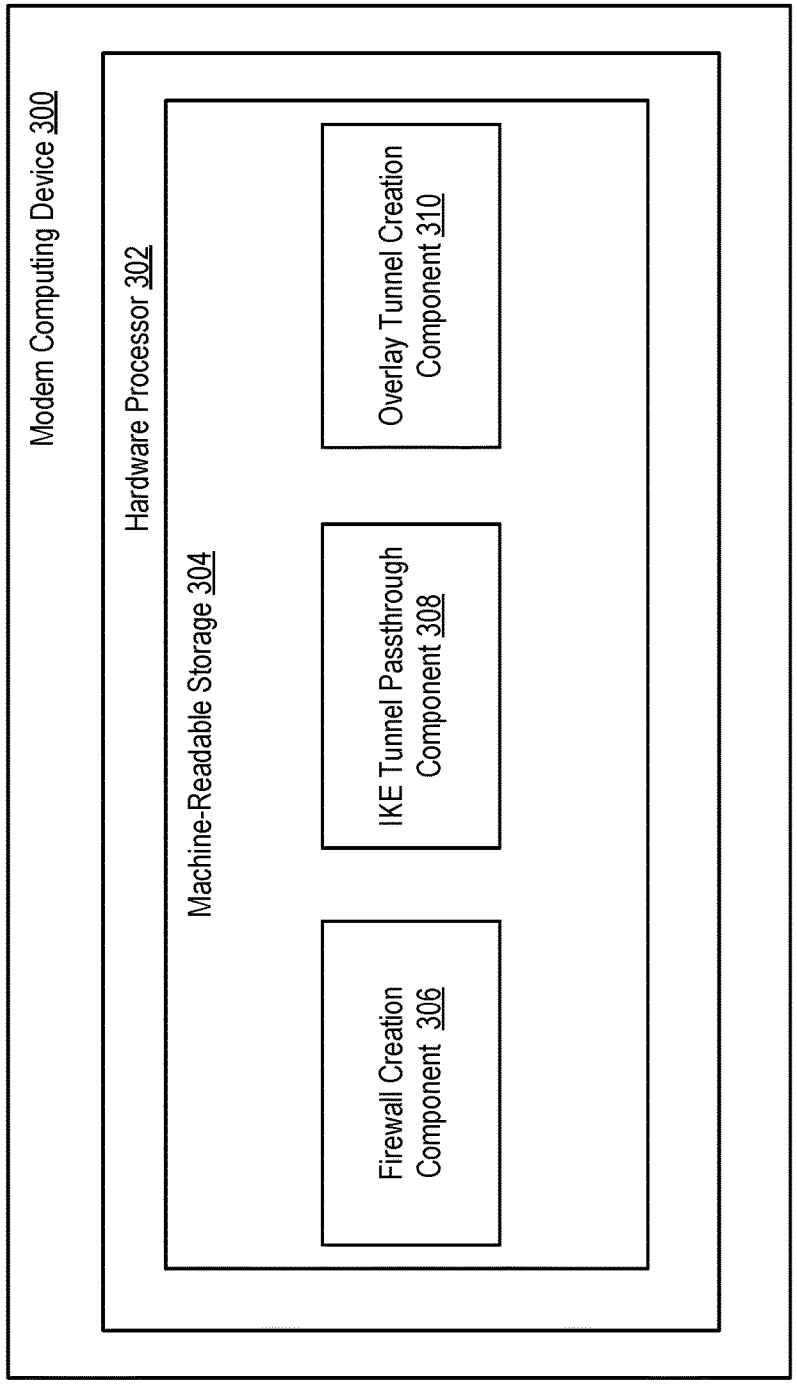
FIG. 3A illustrates an example system architecture that can be implemented to effectuate cloud-managed tunnel orchestration in accordance with various embodiments.
Figure 3B:
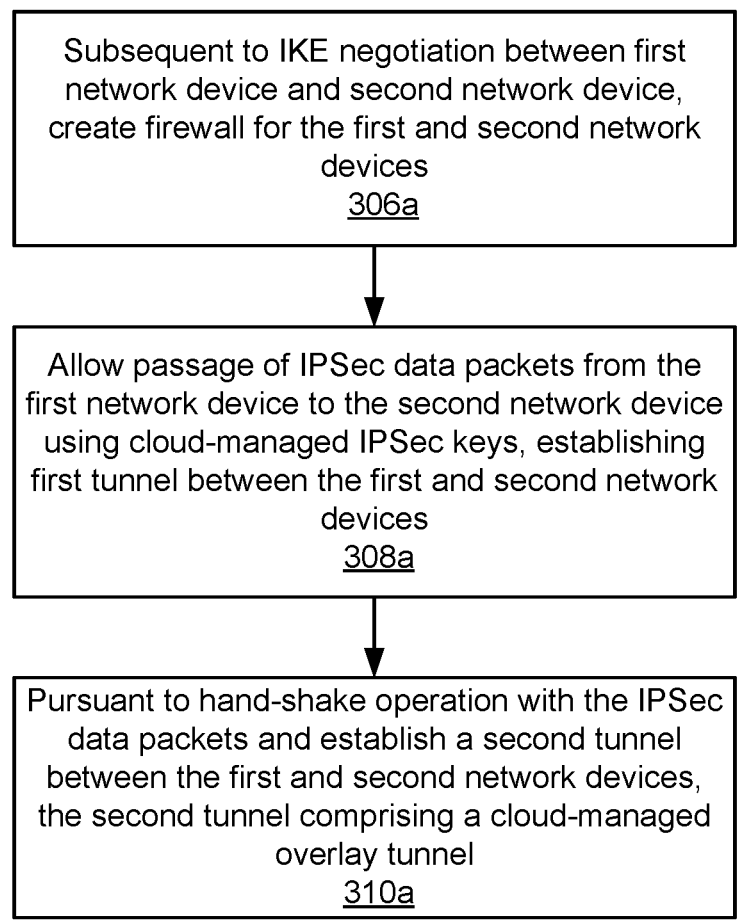
FIG. 3B is an example flowchart illustrating example operations that can be performed to effectuate cloud-managed tunnel orchestration in accordance with various embodiments.

FIG. 3A and FIG. 3B will be described in conjunction with each other. FIG. 3A illustrates an example system architecture for bypassing an IKE firewall when using cloud-managed or -provided IPSec/IKE keys, and FIG. 3B illustrates a corresponding method of operation for bypassing the IKE firewall.

As illustrated in FIG. 3A, a computing device 300, which may be embodied as/in a network device, such as modem 120, may be implemented in a network, such as an SD-WAN, where computing device 300 facilitates a connection between a branch gateway, such as branch gateway 112, and a remote end-point device, such as a VPNC 154 vis-à-vis the Internet or other data network. It can be appreciated that computing device 300 may be associated with a particular Internet Service Provider (ISP).

Computing device 300 may comprise one or more computing components embodied by a hardware processor 302, e.g., one or more central processing units (CPUs), semiconductor-based microprocessors, and/or other hardware devices suitable for retrieval and execution of instructions stored in machine-readable storage medium 304. Hardware processor 302 may fetch, decode, and execute instructions, such as instructions embodying the method/operations illustrated in FIG. 3B as described in greater detail below. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.\

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 304 may be a non-transitory storage medium, where the term "non-transitory" does not encompass transitory propagating signals. As described in detail below, machine-readable storage medium 304 may be encoded with executable instructions.

In some embodiments, computing device 300 may comprise a firewall creation component 306. As illustrated in FIG. 3B at operation 306a, subsequent to IKE negotiation between first and second network devices, such as end-point devices, a firewall session may be created. The IKE negotiation or exchange may involve, as described above, a series of requests and responses addressing SA initiation to establish requisite security associations, authentication of the first and second end-point devices, and an exchange of relevant information (such as certain notifications, configuration data, etc.). That is, the end-point devices (or IPSec peers) are authenticated using IKE, and IKE SAs may be negotiated. IKE may negotiate the IPSec SA parameters, and matching IPSec SAs are established in the end-point devices. The firewall session may be created to determine whether a packet should be processed and forwarded/transmitted or discarded (because of a protocol violation, information mismatch, etc.).

As discussed above, when the IPSec passthrough feature is enabled in a network device, such as network device 300, cloud-managed IKE/IPSec keys are distributed to end-point devices directly, instead of creating keys pursuant to the IKE negotiation. However, without undergoing IKE negotiation, network device 300 would drop/discard any IPSec/IKE overlay packets meant to establish an overlay tunnel. Therefore, and to the above, the firewall session may operate to allow overlay packets to pass through network device 300. That is, in accordance with operation 308a, the passage of IPSec data packets (or ESP packets) from the first network (end-point) device to the second network (end-point) device is allowed. A first (IKE/IPSec) tunnel may then be established. The establishment of this first tunnel will allow the first and second network (end-point) devices to perform a hand-shake operation with IPSec data packets to establish a second tunnel comprising a cloud-managed overlay tunnel at operation 310a. Thus, instead of being dropped by network device 300, the IPSec data packets can pass through network device 300 pursuant to receipt of cloud-managed IPSec/IKE keys from an SD-WAN orchestrator to facilitate the establishment of the overlay tunnel. The first tunnel may be gracefully taken down once the second/overlay tunnel has been established.

Figure 4:
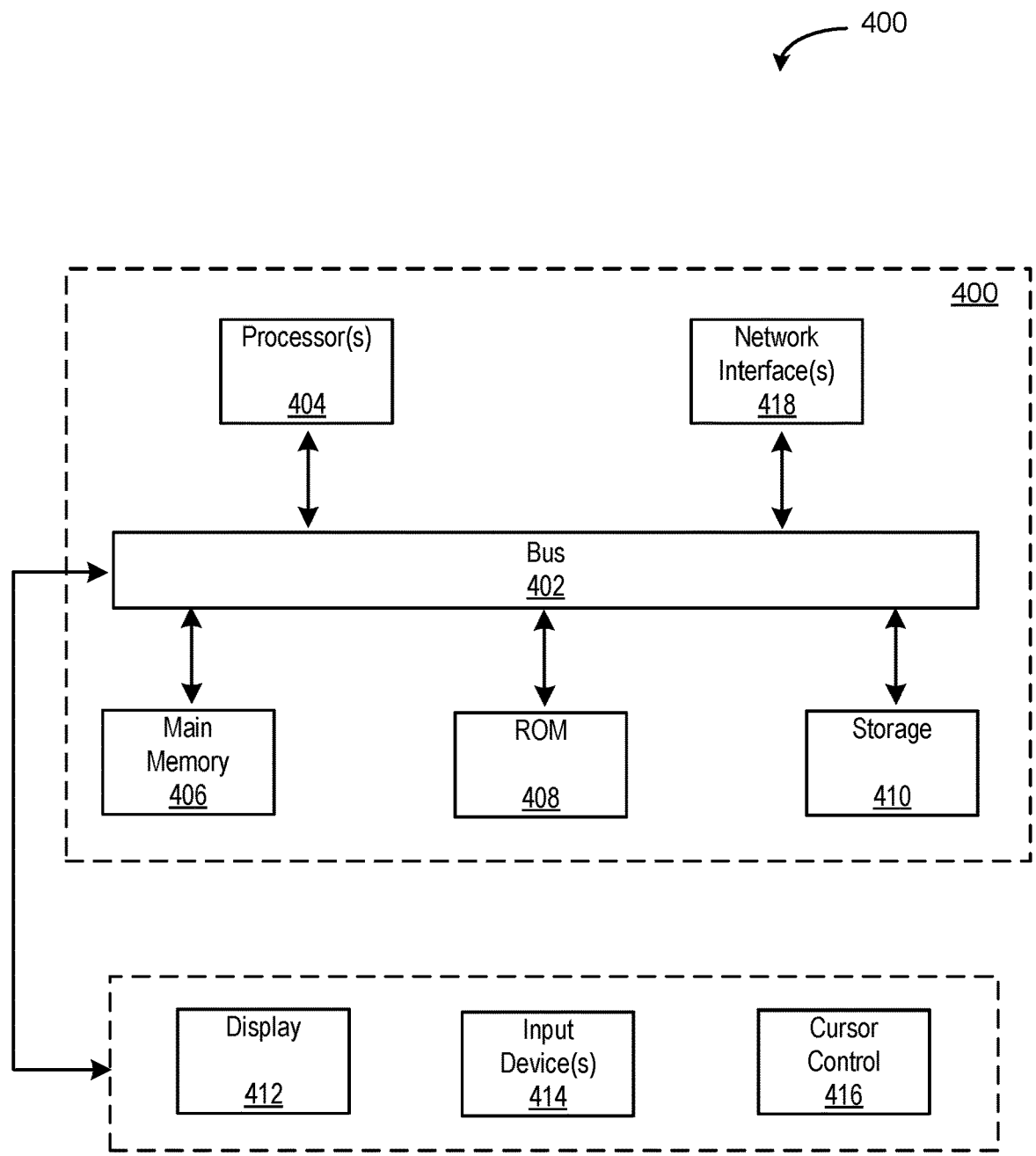
FIG. 4 is an example computing component that may be used to implement various features of embodiments described in the present disclosure.

FIG. 4 depicts a block diagram of an example computer system 400 in which various of the embodiments described herein may be implemented. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may be coupled via bus 402 to a display 412, such as a liquid crystal display (LCD) (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. In some embodiments, the same direction information and command selections as cursor control may be implemented via receiving touches on a touch screen without a cursor.

The computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

The computer system 400 also includes a communication interface 418 coupled to bus 402. Network interface 418 provides a two-way data communication coupling to one or more network links that are connected to one or more local networks. For example, communication interface 418 may be an integrated services digital network (ISDN) card, cable modem, satellite modem, or a modem to provide a data communication connection to a corresponding type of telephone line. As another example, network interface 418 may be a local area network (LAN) card to provide a data communication connection to a compatible LAN (or WAN component to communicated with a WAN). Wireless links may also be implemented. In any such implementation, network interface 418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 418, which carry the digital data to and from computer system 400, are example forms of transmission media.

The computer system 400 can send messages and receive data, including program code, through the network(s), network link and communication interface 418. In the Internet example, a server might transmit a requested code for an application program through the Internet, the ISP, the local network and the communication interface 418.

The received code may be executed by processor 404 as it is received, and/or stored in storage device 410, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 400.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

What is claimed is:

1. A method comprising:
   detecting, at a first network device between a second network device and a third network device, an Internet Key Exchange protocol (IKE) key negotiation between the second network device and the third network device;
   based on detecting the IKE key negotiation between the second network device and the third network device, creating a firewall session in the first network device between the second and third network devices, wherein a first Internet Protocol Security (IPSec) tunnel is established through the first network device between the second and third network devices using the IKE key negotiation, the first tunnel being compliant with the firewall session and allowing passage of IPSec data packets through the first network device between the second and third network devices;
   passing, through the first network device based on the establishment of the first tunnel, the IPSec data packets exchanged between the second and third network devices using cloud-managed IPSec keys from a cloud-based orchestrator, wherein the IPSec data packets are exchanged as part of a hand-shake operation that results in an establishment of a second tunnel between the second and third network devices according to the cloud-managed IPSec keys, wherein the second tunnel is an overlay tunnel on an underlay network; and
   after the establishment of the second tunnel and the cloud-managed IPSec keys are active, discarding the negotiated IKE and taking down the first IPSec tunnel gracefully without disrupting encrypted communications between the second and third network devices.

2. The method of claim 1, wherein the second network device comprises a branch gateway operative in a software-defined wide area network (SD-WAN).

3. The method of claim 2, wherein the cloud-based orchestrator is a SD-WAN orchestrator.

4. The method of claim 1, wherein the second network device comprises a virtual private network concentrator operative in a software-defined wide area network (SD-WAN).

5. The method of claim 1, comprising enabling an IPSec passthrough feature at the first network device.

6. A first network device comprising:
   a hardware processor; and
   a non-transitory storage medium storing instructions executable on the hardware processor to:
   perform, with a second network device, an Internet Key Exchange protocol (IKE) key negotiation comprising an exchange of messages that pass through a third network device between the first network device and the second network device;
   establish, between the first network device and the second network device, a first Internet Protocol Security (IPSec) tunnel using keys from the IKE key negotiation, the first IPSec tunnel passing through the third network device;
   receive, at the first network device, cloud-managed IPSec keys from a cloud-based orchestrator;
   perform a hand-shake operation between the first network device and the second network device in which IPSec data packets are passed in the first IPSec tunnel through the third network device, the IPSec data packets for establishing a second tunnel according to cloud-managed IPSec keys; wherein the second tunnel is an overlay tunnel on an underlay network; and
   after the establishment of the second tunnel and the cloud-managed IPSec keys are active, discarding the negotiated IKE and taking down the first IPSec tunnel gracefully without disrupting encrypted communications between the first and second network devices.

7. The first network device of claim 6, wherein the first network device comprises a branch gateway.

8. The first network device of claim 6, wherein the IPSec data packets are allowed to pass through the third network device pursuant to an IPSec passthrough feature enabled on the third network device.

9. The first network device of claim 6, wherein the first network device comprises a virtual private network concentrator.

10. The first network device of claim 6, wherein the taking down of the first tunnel comprises:
    disabling a link between the first network device and the second network device.

11. The first network device of claim 6, wherein the taking down of the first tunnel comprises:
    discarding the negotiated IKE keys from the key negotiation.

12. A non-transitory machine-readable storage medium comprising instructions that upon execution cause a first network device to:
    perform, at the first network device with a second network device, an Internet Key Exchange protocol (IKE) key negotiation comprising an exchange of messages that pass through a third network device between the first network device and the second network device;
    establish, between the first network device and the second network device, a first Internet Protocol Security (IPSec) tunnel using keys from the IKE key negotiation, the first IPSec tunnel passing through the third network device;
    receive, at the first network device, cloud-managed IPSec keys from a cloud-based orchestrator;
    perform a hand-shake operation between the first network device and the second network device in which IPSec data packets are passed in the first tunnel through the third network device, the IPSec data packets for establishing a second tunnel;
    establish, between the first network device and the second network device, the second tunnel according to the cloud-managed IPSec keys, wherein the second tunnel is an overlay tunnel on an underlay network; and
    after the establishment of the second tunnel and the cloud-managed IPSec keys are active, discard the negotiated IKE and take down the first IPSec tunnel gracefully without disrupting encrypted communications between the second and third network devices.

13. The non-transitory machine-readable storage medium of claim 12, wherein the taking down of the first tunnel comprises:
  disabling a link between the first network device and the second network device, or
  discarding the IPSec keys from the key negotiation.

14. The non-transitory machine-readable storage medium of claim 12, wherein the first network device comprises a branch gateway or a virtual private network concentrator.

* * * * *